July 11, 1967 M. BERNEY 3,330,526
CLAMP FOR FLEXIBLE HOSE
Filed June 29, 1964

INVENTOR
MARTIN BERNEY

3,330,526
CLAMP FOR FLEXIBLE HOSE
Martin Berney, 485 Montrose St., Winnipeg 9, Manitoba, Canada
Filed June 29, 1964, Ser. No. 378,649
2 Claims. (Cl. 251—9)

ABSTRACT OF THE DISCLOSURE

The invention relates to a clamp for flexible hoses in which the hose is located within a form of channel and a movable plate is pivoted in the channel and can be swung from a vertical position to a substantially horizontal position thus clamping off the hose or releasing same.

My invention relates to new and useful improvements in clamping devices for flexible hose, particularly flexible hoses made of plastic and normally used for dispensing fluids from flexible plastic containers.

The conventional method of clamping said hoses usually comprises a clip made of metal or the like but due to the relative rigidity of the plastic dispensing hoses normally used, such clips have to be relatively strong in order to ensure complete shut off of the flow within the tube.

This makes such clips relatively large and unwieldly as well as the fact of making them relatively difficult to use.

Another disadvantage of conventional spring clips is that they have to be removed while the fluid is flowing or alternatively, have to be held in the open position. This is disadvantageous particularly when dispensing a relatively large quantity of liquid.

The present device overcomes these disadvantages by providing a relatively simple plastic or metal clamp which can be moved either to the open position or closed position and will remain in either position without attention. It can also be held manually in any intermediate position thus acting as a regulator.

Furthermore the clamp includes a camming action thus ensuring that complete shut off of the flexible tubing is obtained.

The principal object and essence of the invention is therefore to provide a device of the character herewithin described which permits a flexible hose to be opened or closed without the necessity of retaining pressure upon the clamp.

Another object of the invention is to provide a device of the character herewithin described which includes a camming action thus permitting sufficient pressure to be placed upon the clamp to ensure complete shut off of the tube.

Another object of the invention is to provide a device of the character herewithin described in which the clamp can be moved in any position along the flexible hose.

A still further object of the invention is to provide a device of the character herewithin described which although applying sufficient pressure for shut off purposes, nevertheless does not damage the wall of the flexible hose upon which it is normally used.

A still further object of the invention is to provide a device of the character herewithin described which is simple in construction, economical in manufacture and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which.

In the drawings like characters of reference indicate corresponding parts in the different figures.

Figures 1, 2:
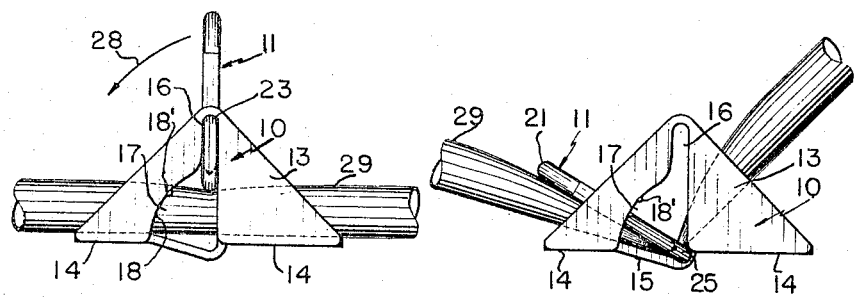
FIGURE 1 is a side elevation showing the device in the open position and upon a length of flexible hose.
FIGURE 2 is a view similar to FIGURE 1 but showing the device in the closed position upon a length of flexible hose.
Figure 3:
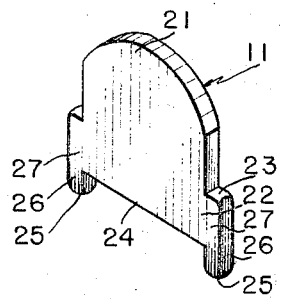
FIGURE 3 is an isometric view of the camming clamp plate per se.

Proceeding therefore to describe my invention in detail, reference should be made to the accompanying drawings in which 10 illustrates generally the hose receiving portion of my device and 11, the camming clamp plate.

In detail, the hose receiving portion comprises a base generally designated 12 within a pair of substantially triangular upstanding side plates 13 formed integrally with the base plate and made preferably of plastic.

The base plate comprises a pair of horizontal portions 14 with an intermediate inclined portion 15 formed between the two horizontal portions 14.

Apertures 15' are formed within the sides plates 13, said apertures including vertical camming plate reciprocating portions 16 and clamp plate rotation portions 17 formed at the lower ends of the vertical portion 16, the curved edge 18 of the portions 17 of the apertures forming a camming surface.

Figure 5:
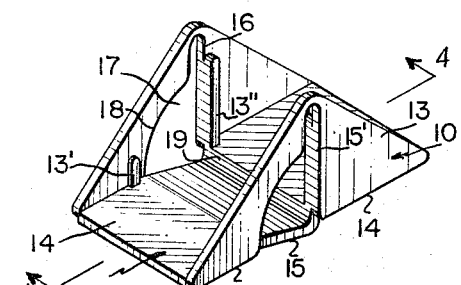
FIGURE 5 is an isometric view of the main body portion per se.
Figure 4:
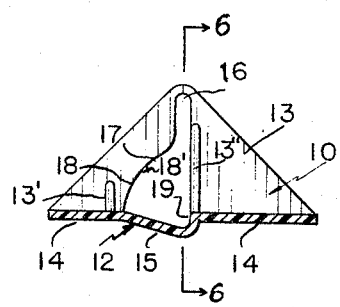
FIGURE 4 is a side section of the main body portion of the device, per se.
Figure 6:
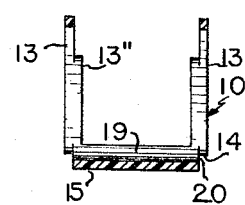
FIGURE 6 is a sectional view along the line 6—6 of FIGURE 4.

Note should also be taken of the step 19 between the intermediate base portion 15 and one horizontal portion 14 as clearly shown in FIGURES 4 and 5.

Also of note is the fact that the intermediate base portion 15 is slightly narrower in width than the horizontal portion 14 thus defining a shoulder 20 upon each side of the inclined portion 15 which acts as a fulcrum area as will hereinafter be described.

The camming clamp plate 11 comprises the upper manipulable portion 21 and the lower actuating portion 22. The actuating portion is wider than the upper portion 21 and the shoulders 23 between the two portions also form fulcrum areas as will hereinafter be described.

The base edge 24 of the plate 11 is spaced upwardly from the two side portions 25 thus defining relatively short leg portions 26, one upon each side of the plate 11.

When assembled, the shouldered areas 27 of the lower portion 22 of the plate 11 engage within the apertures 15 of the side plates and are prevented from displacement therefrom.

The clamping plate 11 can reciprocate vertically within the portions 16 of the apertures 15 and when moved downwardly sufficient for the shoulders 23 to clear the lower ends of the vertical portions 16 of the apertures, can be rotated in the direction of arrow 28 so that the shoulders 23 follow the camming surfaces 18 of the lower apertures 17.

When in the position for rotation, the edge 24 is adjacent the base of the body portion and the leg portions 25 are engageable under the fulcrum areas 20 of the body portion as shown in FIG. 2. This permits the camming plate to be rotated and to apply clamping pressure upon the flexible hose 29 which passes through the body portion and is situated between the base 14 and the lower edge 24 of the camming plate.

As the camming plate is moved in the direction of arrow 28, the edge 24 of the camming plate is forced closer into contact with the inclined portion 15 at the step 19 thus closing off the hose with this camming action.

Small projections 18' are situated on the camming surfaces 18 to prevent the inadvertent release of the plate. The plate is forced over these projections during the closing action. Note should also be taken of the bevel formed on the lower edge 24 of the plate which lies in the natural crease of the flexible tubing when closed in order to give an efficient seal.

To release the hose it is merely necessary to move the camming plate in the direction opposite to arrow 28 and then move it upwardly within the vertical portions 16 of the slots 15 thus releasing the hose to the position shown in FIGURE 1. Also while in the position shown in FIGURE 1, the clamp can be slipped along the hose to the desired position.

The movement of the plate 11 is limited in both directions by the projecting stops 13' and 13" formed on the inner surfaces of the sides 13.

Since various modifications can be made in my invention as hereinabove described and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A clamp for flexible hose comprising in combination a hose receiving portion and a camming clamp plate pivotally mounted in said hose receiving portion, said hose receiving portion including a base and spaced and parallel upstanding apertured side plates secured to said base, said camming plate being pivotally mounted within said side plates with the associated hose passing between said base plate and the lower edge of said camming clamp plate, the apertures within the side plates of said hose receiving portion including clamp plate vertically reciprocating portions and clamp plate rotation portions, said clamp plate being mounted between said side plates for vertical movement and rotational movement therein, said base plate including a pair of outer horizontal portions and an intermediate inclined clamping portion, said intermediate inclined clamping portion having a width slightly less than at least one of said horizontal portions thereby defining clamp plate fulcrum areas at the junction between said one horizontal portion and said clamping portion, said clamp plate and rotation portions providing means for effecting a camming action upon rotational movement of said clamp plate sufficient to apply a clamping pressure by said clamp plate to a hose associated therewith and projecting means on the inner surfaces of said side plates to limit the extremities of rotational movement of said clamping plate.

2. The device according to claim 1 in which said clamping plate includes side shoulders on the lower portion thereof engageable within said apertures in said side plates, said shoulders defining bearing areas for selective engagement with said fulcrum areas of said base.

References Cited

UNITED STATES PATENTS

| | | | |
|---|---|---|---|
| 355,467 | 1/1887 | Parker | 251—7 |
| 1,238,521 | 8/1917 | Janish | 251—7 |
| 1,580,649 | 4/1926 | Christiansen | 251—10 |
| 2,285,821 | 6/1942 | Maloney | 251—4 |
| 2,804,092 | 8/1957 | Aitchison | 251—9 X |

FOREIGN PATENTS 928,057   5/1947   France.

WILLIAM F. O'DEA, *Primary Examiner.*

R. GERARD, *Assistant Examiner.*